United States Patent Office 3,211,659
Patented Oct. 12, 1965

3,211,659
PROCESS AND COMPOSITIONS FOR CLEANING SHELL EGGS
Harry R. Pikaar, Los Angeles, Calif., assignor to Purex Corporation, Ltd., Lakewood, Calif., a corporation of California
No Drawing. Filed Oct. 2, 1961, Ser. No. 142,002
8 Claims. (Cl. 252—136)

This invention relates to removal of various contaminants from the surface of shell eggs, and is particularly concerned with a novel process and compositions for the chemical removal of such contaminants prior to grading and marketing of the eggs.

The primary contaminants contained on the outer surface of eggs are soil, blood, manure, feathers, nest material and broken egg residues, which consist primarily of proteinaceous constituents. Farmers and egg handlers have been washing dirty eggs for many years in an effort to decrease spoilage, minimize economic losses, and increase saleable production. The procedures for washing eggs now being employed are many and varied, and meet with only varying degrees of success. Thus, for example, eggs heretofore have been cleaned by abrasive cleaning, using an emery belt. This method is slow and time consuming and results in a high percentage of broken eggs. Also, cleaning by both soak and spray operation have been employed. One such operation involves the use of plain water followed by a physical scrubbing action. Chemical cleaning, employing alkaline cleaners containing various combinations of alkaline salts and/or chlorine-releasing agents, has also been utilized. Such alkaline cleaners are usually composed of mixtures of alkalies, silicate salts, carbonates, wetting agents, and the like. The cleaning action of these compositions is based substantially entirely on the principle of removing the contaminants by penetration, bleaching and/or wetting action. These materials, however, do not penetrate deep enough into the surface of the egg, thereby resulting in incomplete soil and stain removal.

Another problem encountered in washing eggs with water, or with aqueous cleaning solutions of the types described generally above, is that egg spoilage is increased when the water employed for this purpose contains as little as 5 to 10 parts per million of iron in solution. The presence of iron in the wash solution reverses the protective action of the egg's conalbumin.

It is an object of the invention to provide a process and safe, non-toxic compositions for cleaning shell eggs, which results in substantially complete removal of soils and stains from the shell rapidly and economically.

Another object is the provision of procedure and of safe, non-toxic compositions for cleaning shell eggs, without producing a powdered egg shell surface, and while improving the physical appearance and texture of the egg.

A still further object is to afford a process and safe, non-toxic compositions for cleaning shell eggs, while substantially reducing or eliminating egg spoilage caused by the presence of iron contamination or hardness in the wash water or solution, and reducing the number of rejects.

Yet another object is the provision of egg-cleaning compositions for use in the aforementioned process, having a very low coefficient of toxicity.

Other objects and advantages will appear hereinafter.

The above objects and advantages are accomplished according to the invention by treating eggs containing soil and stains on the surface thereof with an aqueous solution of a non-toxic acid, and having a pH preferably between about 1.3 and 5. In preferred practice a mild acid cleaning composition is employed, e.g., one containing citric acid as essential acid component, whose cleaning action is based not solely on a soil penetrating or bleaching action, as in the case of prior art cleaning compositions, but which accomplishes soil and stain removal by an undercutting or excavating action on the surface of the egg, beneath the soil and organic contaminants.

Removal of all of the contaminants is believed to be actually accomplished by chemically etching away a minute portion of the egg shell itself. The soils and organic contaminants are undermined and released in one continuous film as the surface of the egg shell is attacked by the presence of free H+ ions. The etching effect on the egg shell does not adversely alter the quality of the egg, but is of sufficient magnitude to completely undercut and remove the deeply embedded stains. The egg shell is composed primarily of calcium carbonate (lime) and the basic chemical reaction occurring to produce the etching effect is believed to be as follows:

$$Ca \cdot CO_3 + 2H^+ \rightarrow Ca^{++} + CO_2 \uparrow + H_2O$$
(Lime)   (Acid)

I have found that a special acid source of hydrogen ion is necessary in order to produce a clean, commercially acceptable egg under toxicologically safe processing methods and under conditions required in commercial production. Thus, for example, use of the common strong acids, such as sulfuric, hydrochloric, nitric, oxalic, and hydrofluoric acids, whose aqueous solutions generally have a pH less than 1.3, are unsuitable as H+ ion donors in the invention. Sulfuric, oxalic and hydrofluoric acids produce an undesirable powdered surface condition on the egg, due to the formation of insoluble calcium sulfate, calcium oxalate or calcium fluoride. Most of these acids are also highly corrosive on egg cleaning equipment and have a high level of toxicity. Nitric acid also has an undesirable chemical effect on the protein constituents of the egg. Further, none of these acids functions to reduce the iron content of the aqueous processing solution sufficiently to reduce egg spoilage caused by the presence of iron ion in the solution.

I have found that suitable sources of hydrogen ion to achieve the purposes of the invention include generally, non-toxic acids having a dissociation constant not in excess of about $10^{-3}$, and usually in the range of about $10^{-3}$ to about $10^{-5}$. Examples of such acids are acetic acid, an alkylene diamine tetraacetic acid such as ethylene diamine tetraacetic acid (EDTA), or propylene or butylene diamine tetraacetic acid, citric acid, tartaric acid, gluconic acid, glyceric acid, malic acid, glycolic acid, saccharic acid, phosphoric acid and benzoic acid. Salts of acids such as acetic acid, which furnish the free acid in solution, can also be employed; for example, sodium diacetate, which forms acetic acid in solution.

However, I have found that sulfamic acid is also suitable for purposes of the invention, although it has a dissociation constant in excess of the $10^{-3}$ upper limit characterizing the acids generally employed and described above.

The preferred acids, in the order named, are: citric acid, phosphoric acid, gluconic acid, acetic acid and tartaric acid. It has also been found that a combination of any two or more of the above acids can also be employed to advantage in the invention process. The pH of the acid cleaning solution of the invention, employing the above acids, should be maintained between about 1.3 and about 5, the preferred range being between about 1.3 and about 3.5 for best results.

The above acids possess sufficient acidity to enable the acid to have an etching function on the egg shell, for efficient removal of contaminants as described above, yet provide minimum corrosion on the processing equipment. These acids also function to clean the egg without producing a powdered egg shell surface. In addition, most of the acids described above, including, for example, citric, gluconic and tartaric acids, have the ability to form a complex with iron ions in the solution, thus removing such ions, with the resulting beneficial effect of reducing egg spoilage.

The above noted acids further have an extremely low coefficient of toxicity, that is, they are substantially non-toxic, and their use in the invention process provides safety to both the processor and consumer.

The amount of the above-noted acid present in the egg washing solution of the invention is generally in the range of about 1% to about 10% by weight of solution, preferably about 2% to about 6%, although amounts outside this range can also be utilized. The strength or concentration of acid in the solution employed is dependent on the amount and type of contamination on the eggs to be treated, the temperature of the solution, the processing time and the type of processing equipment employed. Temperature of the solution can range from about ambient to about 120° F., preferably not above about 115° F. Processing time for eggs treated according to the invention procedure, employing the above acid solution, usually varies from about 3 to about 10 minutes, depending on concentration of acid in the solution, temperature thereof, and method of contacting the eggs with the solution in the cleaning process. The eggs can be cleaned, according to the invention, by spray application of the solution while the eggs are being conducted through a spray chamber, e.g. on a conveyor belt, by scrubbing the eggs with a brush employing such solution, or by immersing the eggs in racks or equivalent holders in the acid solution contained in a tank, either with or without agitation of the solution.

As another feature of the invention, I have also found that the inclusion in the acid composition of the invention, of a second component in the form of a soluble acid phosphate or acid pyrophosphate, having a pH in water solution ranging from between 4 and 7, or boric acid, enhances the effectiveness of the composition for cleaning eggs, and is also beneficial in controlling the speed of the reaction. Examples of such phosphates include the mono alkali metal dihydrogen phosphates and the alkali metal dihydrogen pyrophosphates, such as the sodium and potassium derivatives, e.g. $NaH_2PO_4$ and $Na_2H_2P_2O_7$, and their ammonium analogues. These phosphate compounds, and also boric acid, appear to function in a buffering capacity, to furnish a controlled source of hydrogen ion as the primary acid component, e.g., critric acid, becomes depleted so as to maintain the solution within the above noted pH range of about 1.3 to 5, and also acts as a reserve pH source, to function in conjunction with the primary acid component, for more efficiently complexing iron ion in solution, and thus acting as a reserve water softening agent. The amount of this second component employed in the aqueous solution is minor in comparison to the amount of primary acid component, the amount of the former generally employed ranging from about 0.1% to about 5%, usually about 0.1% to about 2%, by weight of solution. The amount of second component employed should not be such as to increase the initial pH of the cleaning solution above pH 5, and preferably not above 3.5.

It is to be understood that, although the presence in the invention cleaning solution of the above noted alkali metal phosphate compound and/or boric acid is preferred, the aqueous solution of the above described primary acid component alone is sufficient for producing the desired egg cleaning results.

A third optional component which can be incorporated into the egg cleaning solution of the invention is a wetting agent, preferably a nonionic or anionic wetting agent. The wetting agent functions to enhance the wetting power of the solution and improve its effectiveness. Examples of nonionics which can be employed are the alkylaryl polyether alcohols, such as the material marketed as Triton X–100 and believed to be isooctyl phenoxy polyethoxy ethanol. Exemplary of the anionic wetting agents suitable for use in the aqueous egg cleaning solution hereof are the alkyl aryl sulfonates, such as sulfonated dodecyl diphenyl oxide, sodium salt, marketed as Dowfax 2A1, and Nacconol Z, believed to be an 85% alkyl benzene sulfonate having an average of 12 carbon atoms in the alkyl chain. Alkyl aryl sulfonates having, for example, 9 to 15 carbon atoms in the alkyl chain, can be employed. The amount of wetting agent utilized in the acid egg cleaning solution hereof may range from about 0.001% to about 0.1% by weight of solution. It is preferable, when employing a wetting agent, to limit the amount of such wetting agent so as to avoid undesirable foam generation in the processing solution.

Where the primary acid component is an acid such as phosphoric acid or sulfamic acid, which does not form a complex with iron, it is preferred to employ a small amount of another material which complexes with any iron present in the water. Typical of such iron-complexing agents is the material marketed as Versene Fe–3 Specific, believed to be the sodium salt of N,N-di-(betahydroxyethyl) glycine. However, if desired, in place of such auxiliary iron-complexing agent, a small amount of one the other primary acid components, which complex iron, can be employed in conjunction with a major proportion of the non-complexing acid component for this purpose, e.g., a small amount of citric or tartaric acid in combination with phosphoric or sulfamic acid as the major acid component. However, such iron-complexing agents can be omitted, particularly when the composition also includes the above noted second component, such as $NaH_2PO_4$. The amount of this auxiliary complexing agent used in the solution can range from about 0.001% to about 0.5% by weight of solution.

The egg cleaning solution of the invention can be formed either by incorporating the primary acid component, and also the above described second and third components and auxiliary complexing component, where used, separately, into water, or by incorporating mixtures of such components, either in the form of a liquid concentrate or a solid powder mixture, into water, to produce the desired concentrations and relative proportions of these components in the working solution, as described above. A preferred form of the invention composition is a liquid concentrate or solid mixture containing a combination of the primary acid component or components, the alkali phosphate or boric acid component, and, if desired, the wetting agent and/or auxiliary complexing component, in proper proportions. In such compositions, the amount of primary acid component employed can vary from about 50% to about 98%; the amount of acid phosphate compound or boric acid can range from about 2% to about 50%; the amount of wetting agent, if employed, is in the range of about 0.1% to about 1%; and, where employed, the amount of auxiliary complexing agent used can vary in the range of about 0.05% to about 5%, by weight of the composition. Such liquid concentrate or solid mixture can be added to water in an amount ranging from about 2 to about 10 ounces per gallon of solution, to form a working solution.

The following are examples of practice of the invention.

EXAMPLE 1

Soiled eggs containing soil and organic contaminants on the surface thereof were treated respectively in separate baths, each containing a 3% water solution of one of the acids acetic, citric, phosphoric, gluconic, tartaric and sulfamic acids. The eggs were soaked in the above baths, maintained at ambient temperature, for a period of about 5 minutes, and were then water rinsed.

The great majority of the eggs treated in the above manner were clean, with substantially all soils and stains removed from the shell, and had good physical appearance and texture.

EXAMPLE 2

The following compositions were prepared:

Composition A

| | Percent by weight |
|---|---|
| 75% phosphoric acid | 40.0 |
| Citric acid | 30.0 |
| Gluconic acid | 0.3 |
| Water | 29.7 |
| | 100.0 |

Composition B

| | |
|---|---|
| Gluconic acid | 60.0 |
| 75% phosphoric acid | 15.0 |
| Citric acid | 1.0 |
| Water | 24.0 |
| | 100.0 |

Composition C

| | |
|---|---|
| Acetic acid | 40.0 |
| 75% phosphoric acid | 20.0 |
| Tartaric acid | 1.0 |
| Water | 39.0 |
| | 100.0 |

Composition D

| | |
|---|---|
| Sulfamic Acid | 90.0 |
| Monosodium phosphate ($NaH_2PO_4$) | 9.7 |
| Sulfonated dodecyl diphenyl oxide, sodium salt (dowfax. 2A1) | 0.2 |
| Sodium salt of N,N-di-(betahydroxyethyl) glycine-(Versene Fe-3 Specific) | 0.1 |
| | 100.0 |

Composition E

| | |
|---|---|
| Citric acid | 86.25 |
| Tartaric acid | 3.00 |
| Gluconic acid | 0.25 |
| Triton X–100 | 0.50 |
| Monosodium phosphate | 10.00 |
| | 100.0 |

Compositions A, B and C are liquid concentrates, and Compositions D and E are powdered mixtures. Each of these compositions was added to water to form a solution having a 3% total acid concentration.

Eggs having soil and organic stains thereon were soaked in each of these respective solutions, maintained at ambient temperature, for a period of treatment of about 5 minutes, and were then rinsed with water.

Practically all of the eggs treated in each of the above solutions were observed to be free of dirt and stain and had good physical appearance.

It was noted, however, that the soil and stain were more rapidly removed from the eggs treated in the solutions of Compositions D and E, containing monosodium phosphate, as compared to the rate of contaminant removal from the eggs washed in the solutions of Compositions A, B and C, not containing this material.

Further, the solutions of Compositions D and E have a longer tank life, and are effective over a longer period of use, than the solutions of Compositions A, B and C.

EXAMPLE 3

Eggs having soil and organic contaminants thereon, including blood and proteinaceous material, were subjected to treatment in a two-stage cleaning process. The eggs were placed in holders on a conveyor belt, and the eggs were first conducted by the conveyor through the first stage, in the form of a spray chamber, wherein a conventional chlorinated alkaline cleaning solution, maintained at a temperature of between 100° and 110° F. was sprayed on the eggs during their transit through the chamber. The eggs were then conveyed through the second stage, in the nature of a rinse chamber, wherein the eggs were sprayed with a water rinse at ambient temperature. Total transit time through both chambers was 3 minutes, about 1½ minutes in each of the two stages.

A substantial proportion of the eggs treated in the above manner, utilizing the above noted prior art type of chlorinated alkaline cleaner, still contained sufficient soil and organic contaminants as to render them unmarketable for the consumer trade. In an eight-hour shift, rejects of this type averaged between 4 and 8 cases of eggs in a modest commercial operation utilizing the above described process.

Specially soiled eggs, from among those rejects which had been subjected to the above process, were then subjected to the same two-stage cleaning procedure described above, and under the same conditions of treatment, except that the cleaning solution employed in the first stage was a solution formed by dissolving Composition F, below, in water in an amount of about 5 to 6 ounces of Composition F per gallon of solution.

Composition F

| | Percent by weight |
|---|---|
| Citric acid | 90.0 |
| Monosodium phosphate | 10.0 |
| | 100.0 |

Approximately 95% of these eggs, which could not be cleaned using a conventional chlorinated alkaline cleaning solution, were cleaned sufficiently free of soil and organic contaminants to be marketable for the consumer trade, when such soiled eggs were cleaned by the invention procedure employing the invention Composition F. Further, the use of the cleaning process of the invention for one eight-hour working shift in the above described commercial operation resulted in only three rejected eggs.

EXAMPLE 4

Results similar to these noted in Example 3 are obtainable by employing in place of the solution of Composition F, egg cleaning solutions formed by dissolving Composition G or H below in water in an amount of about 5 ounces per gallon of solution.

Composition G

| | Percent by weight |
|---|---|
| Citric acid | 90 |
| Sodium dihydrogen pyrophosphate ($Na_2H_2P_2O_7$) | 10 |
| | 100 |

Composition H

| | |
|---|---|
| Gluconic acid | 90 |
| Boric acid | 10 |
| | 100 |

From the foregoing, it is seen that the egg cleaning process of the invention and the acid compositions employed therein, as described above, constitute a substantial improvement over prior art egg cleaning processes and compositions. Employment of the invention process and composition results in substantially complete removal of soil and stains from the egg shell of even the most highly soiled eggs, improves the physical appearance and texture of the egg, contributing substantially toward the promotion of better customer acceptance and marketability, reduces the amount of bacterial infection of the egg through more efficient cleaning and removal of surface contaminants, minimizes or eliminates egg spoilage caused by the presence of iron hardness in wash water, provides complete safety from a toxicological standpoint, and reduces rejects by at least 50%, and usually substantially more so.

While I have described particular embodiments of my invention for purposes of illustration, it should be understood that various modifications and adaptations thereof may be made within the spirit of the invention, as set forth in the appended claims.

I claim:

1. A process for cleaning shell eggs to remove contaminants from the surface thereof and to reduce egg spoilage, which comprises contacting said eggs with an aqueous solution of about 1 to about 10% by weight of citric acid and about 0.1 to about 5% by weight of monosodium phosphate, said solution having a pH between about 1.3 and 5.

2. An aqueous acid solution effective for cleaning shell eggs to remove contaminants from the surface thereof and to reduce egg spoilage, which consists essentially of about 1 to about 10% by weight of an acid of the group consisting of acetic acid, an alkylene diamine tetraacetic acid, said alkylene group containing from 2 to 4 carbon atoms, citric acid, tartaric acid, gluconic acid, glyceric acid, malic acid, glycolic acid, saccharic acid, phosphoric acid, benzoic acid, and sulfamic acid, and about 0.1 to about 5% by weight of a member of the group consisting of the monosodium, monopotassium, and monoammonium dihydrogen phosphates, and sodium, potassium and ammonium dihydrogen pyrophosphates, said solution having a pH between about 1.3 and 5.

3. An aqueous acid solution effective for cleaning shell eggs to remove contaminants from the surface thereof and to reduce egg spoilage, which consists essentially of about 2 to about 6% by weight of citric acid and about 0.1 to about 2% by weight of monosodium phosphate.

4. A composition effective for cleaning shell eggs and for reducing egg spoilage, which consists essentially of about 50 to about 98% by weight of an acid of the group consisting of acetic acid, an alkylene diamine tetraacetic acid, said alkylene group containing from 2 to 4 carbon atoms, citric acid, tartaric acid, gluconic acid, glyceric acid, malic acid, glycolic acid, saccharic acid, phosphoric acid, benzoic acid and sulfamic acid, and about 2 to about 50% by weight of a member of the group consisting of the monosodium, monopotassium, and monoammonium dihydrogen phosphates, and sodium, potassium and ammonium dihydrogen pyrophosphates.

5. A composition effective for cleaning shell eggs and for reducing egg spoilage, which consists essentially of about 50 to about 98% by weight of an acid of the group consisting of acetic acid, an alkylene diamine tetraacetic acid, said alkylene group containing from 2 to 4 carbon atoms, citric acid, tartaric acid, gluconic acid, glyceric acid, malic acid, glycolic acid, saccharic acid, phosphoric acid, benzoic acid, and sulfamic acid, and about 2 to about 50% by weight of monosodium phosphate.

6. A composition effective for cleaning shell eggs and for reducing egg spoilage, which consists essentially of about 50 to about 98% by weight of an acid of the group consisting of acetic acid, an alkylene diamine tetraacetic acid, said alkylene group containing from 2 to 4 carbon atoms, citric acid, tartaric acid, gluconic acid, glyceric acid, malic acid, glycolic acid, saccharic acid, phosphoric acid, benzoic acid and sulfamic acid, about 2 to about 50% by weight of a member of the group consisting of the monosodium, monopotassium, and monoammonium dihydrogen phosphates, and sodium, potassium and ammonium dihydrogen pyrophosphates, and about 0.1 to about 1% by weight of a wetting agent of the group consisting of anionic and nonionic wetting agents, said wetting agent being compatible in an aqueous solution of said composition.

7. A solid composition effective for cleaning shell eggs and for reducing egg spoilage, which consists essentially of about 50 to about 98% by weight of citric acid and about 2 to about 50% by weight of monosodium phosphate.

8. A process for cleaning shell eggs to remove contaminants from the surface thereof and to reduce egg spoilage, which comprises contacting said eggs with an aqueous solution of about 1 to about 10% by weight of an acid of the group consisting of acetic acid, an alkylene diamine tetraacetic acid, said alkylene group containing from 2 to 4 carbon atoms, citric acid, tartaric acid, gluconic acid, glyceric acid, malic acid, glycolic acid, saccharic acid, phosphoric acid, benzoic acid, and sulfamic acid, and about 0.1 to about 5% by weight of a member of the group consisting of monosodium, monopotassium, and monoammonium dihydrogen phosphates, and sodium, potassium, and ammonium dihydrogen pyrophosphates, said solution having a pH between about 1.3 and 5.

References Cited by the Examiner

UNITED STATES PATENTS

| 2,225,294 | 12/40 | Bolton et al. | 252—142 XR |
|---|---|---|---|
| 2,287,141 | 6/42 | Schofield | 99—113 |
| 2,576,236 | 11/51 | Paden | 99—113 |
| 2,878,188 | 3/59 | Callahan | 252—136 |
| 2,990,374 | 6/61 | Schwartz | 252—136 |
| 2,994,664 | 8/61 | Wachter | 252—142 XR |

FOREIGN PATENTS 248,886   3/26   Great Britain.

OTHER REFERENCES

"The Tetrines," Glyco Products Co. Inc., September 1953, pp. 6, 10, 16.

"Phosphorous and Its Compounds" (reprint from Encyclopedia of Chemical Technology), vol. X, pages 403–510, copyright 1953 (pages 422, 436, 437).

JULIUS GREENWALD, *Primary Examiner*.